FAST-OPERATING ADDER CIRCUITS

Filed Aug. 5, 1959 5 Sheets-Sheet 1

$s'_i = x_i \bar{y}_i + \bar{x}_i y_i$ $c'_{i,i+1} = x_i y_i$ $s''_i = s'_i \bar{c}_{i-1,i} + \bar{s}'_i c_{i-1\ i}$ $c''_{i,i+1} = s'_i c_{i-1,i}$ $s_i = s''_i$ $c_{i,i+1} = c'_{i,i+1} + c''_{i,i+1}$ INVENTORS
JOHN A. WEAVER
DENIS B. JARVIS
LEONARD P. MORGAN
BY Frank R. Jufari
AGENT

INVENTOR
JOHN A. WEAVER
DENIS B. JARVIS
LEONARD P. MORGAN
BY
AGENT

Jan. 22, 1963 L. P. MORGAN ETAL 3,074,639

FAST-OPERATING ADDER CIRCUITS

Filed Aug. 5, 1959 5 Sheets-Sheet 3

INVENTOR
JOHN A. WEAVER
DENIS B. JARVIS
LEONARD P. MORGAN
BY
*Frank R. Trifari*
AGENT Jan. 22, 1963 L. P. MORGAN ETAL 3,074,639

FAST-OPERATING ADDER CIRCUITS

Filed Aug. 5, 1959 5 Sheets-Sheet 4

INVENTOR
JOHN A. WEAVER
DENIS B. JARVIS
LEONARD P. MORGAN
BY
AGENT

INVENTOR
JOHN A. WEAVER
DENIS B. JARVIS
LEONARD P. MORGAN
BY
[signature]
AGENT 3,074,639

FAST-OPERATING ADDER CIRCUITS

Leonard Peter Morgan, South Godstone, John Anthony Weaver, Snow Hill, Crawley Down, and Denis Brian Jarvis, Reigate, Surrey, England, assignors to North American Philips Company, Inc., New York, N.Y., a corporation of Delaware Filed Aug. 5, 1959, Ser. No. 831,759
Claims priority, application Great Britain Aug. 12, 1958
8 Claims. (Cl. 235—175)

This invention relates to binary half-adders and to parallel full adders built up of binary half-adders, each half adder having two input terminals to which the input signals are led in the form of current or no current, and two output terminals which deliver the partial sum and the partial carry, respectively, likewise in the form of current or no current.

It is known, inter alia from R. K. Richards' book: "Arithmetic Operations in Digital Computers," that a binary half-adder must perform the functions of a so-called exclusive OR-gate (for producing the partial sum $\bar{x}y+x\bar{y}$) and of an "AND" gate (for producing the partial carry $xy$). In the said book there is also described how a full adder may be built up of two half-adders. An object of the present invention is to provide an ultra-high speed transistorized half-adder.

The half-adder according to the invention is characterized in that the first input terminal is connected via a resistor, which may have the value 0, to the emitter of a first transistor and also, without a resistor, to the base of a second transistor; that the second input terminal is connected via a resistor (which can never have the value 0) to the emitter of the second transistor and also, without a resistor, to the base of the first transistor; that the emitter of the first transistor is connected via a resistor to an additional terminal and the emitter of the second transistor is connected, via a resistor, to an additional terminal which may coincide with the first-mentioned additional terminal, the last-mentioned resistors being larger than the first-mentioned; that the collector of each of the transistors is connected to the first output terminal and that the emitters of the transistors are also connected, via semi-conductive circuit elements, to the second output terminal.

In order that the invention may be readily carried into effect, it will now be described in detail, by way of example, with reference to the accompanying drawings, in which.

Figure 1:
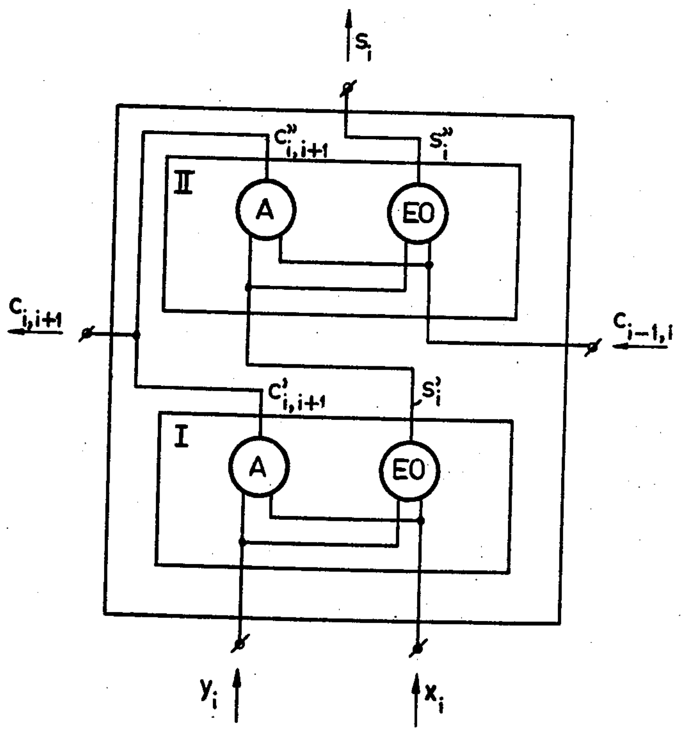
FIG. 1 shows a full adder which is built up of two half-adders.

Referring now to FIG. 1, which shows in what manner a binary full adder is built up of two binary half-adders I and II, $x_i$ and $y_i$ represent information corresponding to the $i^{th}$ digit position of the numbers $x$ and $y$ to be added and $c_{i-1,i}$ represents information corresponding to the carry resulting from the addition at the preceding digit position. The information $x_i$, $y_i$, $c_{i-1,i}$ is the input information of the full adder. The full adder delivers as output information the information $s_i$ and $c_{i,i+1}$ which provides the digit at the $i^{th}$ digit position of the sum $s=x+y$ of the two numbers $x$ and $y$ and the carry resulting from the addition at the $i^{th}$ digit position.

The half-adder I receives the information $x_i$ and $y_i$ and produces therefrom, by the Boolean algebraic method, the auxiliary information:

$$s'_i=x_i\bar{y}_i+\bar{x}_iy_i \text{ and } c'_{i,i+1}=x_iy_i$$

The half-adder II receives the information $c_{i-1,i}$ and also the information $s'_i$ from the half-adder I, producing therefrom the information:

$$s''_i=s_i\bar{c}_{i-1,i}+\bar{s}_ic_{i-1,i} \text{ and } c''_{i,i+1}=s_ic_{i-1,i}$$

Ultimately we have $$s_i=s''_i,\ c_{i,i+1}=c'_{i,i+1}+c''_{i,i+1}$$

The values $s'_i$ and $s''_i$ are referred to as partial sums and the values $c'_{i,i+1}$ and $c''_{i,i+1}$ are referred to as partial carries.

Each half-adder may be built up of an exclusive "OR"-gate EO (which produces the information $s'_i$ and $s''_i$ respectively) and an "AND"-gate A (which produces the information $c'_{i,i+1}$ and $c''_{i,i+1}$ respectively).

Figure 2:
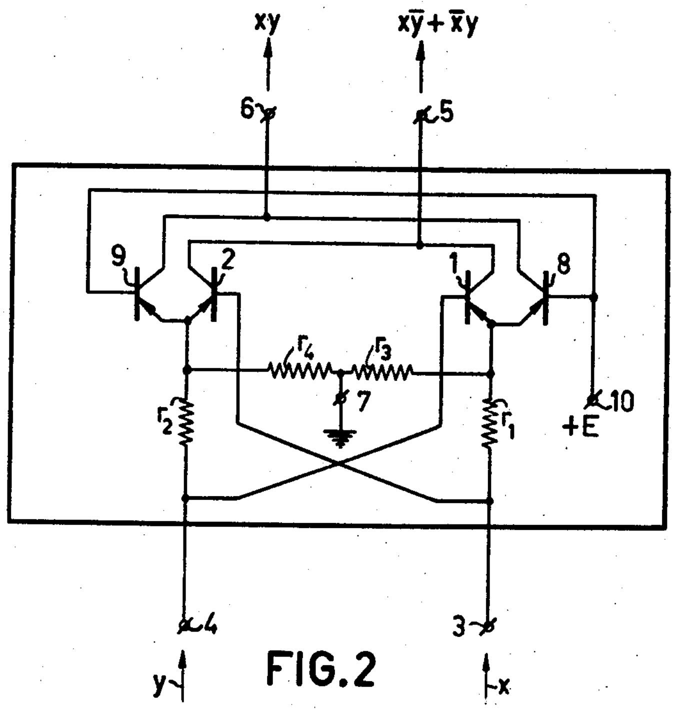
FIG. 2 shows a first example of a half-adder according to the invention.

FIG. 2 shows the diagram of a transistorized half-adder having input terminals 3, 4 and output terminals 5, 6. The exclusive "OR"-gate comprises pnp-transistors 1 and 2 and resistors $r_1$, $r_2$, $r_3$, $r_4$. The "AND"-gate is constituted by two further transistors 8 and 9. The emitters of the pairs of transistors 1, 8 and 2, 9 are connected together. The emitters of the transistors 1 and 8 are also connected, via resistor $r_1$, to input terminal 3 and, via resistor $r_3$, to an additional terminal 7 which is connected to a point of constant potential. The emitters of the transistors 2 and 9 are connected, via resistor $r_2$, to input terminal 4 and, via resistor $r_4$, to the terminal 7. The base of transistor 1 is connected to input terminal 4 and the base of transistor 2 is connected to input terminal 3. The collector of each of the transistors 1 and 2 is connected to output terminal 5 and the collector of each of the transistors 8 and 9 is connected to output terminal 6. Finally, the base of each of the transistors 8 and 9 is connected to a second additional terminal 10.

It is assumed that the value 1 of an input signal or output signal corresponds to a current of the strength $i$ and the value 0 of these signals corresponds to zero current. It is also assumed that the input currents lie at a low positive voltage level with respect to ground. The terminal 7 may then be connected to ground and terminal 10 may be connected to a source of low positive voltage. To ensure proper performance of the circuit arrangement, the voltage E of this voltage source has to satisfy requirements that will be referred to hereinafter.

The arrangement operates as follows: If $x=y=0$, neither of the input terminals 3 and 4 receives input current and hence neither of the output terminals 5 and 6 can deliver output current. If $x=1$, $y=0$, that is to say, if input terminal 3 receives current, but input terminal 4 receives no current, transistor 1 conducts, but the other transistors 2, 8, 9 are cut off, which may be appreciated as follows: The voltage set up across resistor $r_1$ renders the emitter of transistor 1 positive with respect to its base, so that this transistor becomes conducting, but renders the base of transistor 2 positive with respect to its emitter, so that the last-mentioned transistor is cut off. The voltage E must be so high that in this case the base of transistor 8 is positive with respect to its emitter. The same remark then applies to transistor 9 to an equal extent. The transistors 8 and 9 are thus cut off. As a result of this condition, output terminal 5 in this case delivers current, but output terminal 6 delivers no current. A limit for the value of E may be determined as follows. The emitters of transistors 1 and 8 have a potential positive with respect to ground because the base current of transistor 1 flows through $r_2$ and $r_4$ to ground. Let the emitter potential be referred to as V. Then if the transistor 8 is to be cut off we must have $E<V_1$. Because of the symmetry of the circuit arrangement, output terminal 5 delivers current, but output terminal 6 delivers no current even if $x=0$, $y=1$. In this case there is a similar limit to the value of E: $E<V_2$ where $x=y=1$, that is to say, if both input terminals 3 and 4 receive current, both transistors 1 and 2 are cut off, whereas both transistors 8 and 9 are conducting, which may be appreciated as follows. Due to the voltages set up across the resistors $r_1$ and $r_2$, the bases of the transistors 1 and 2 have a positive voltage with respect to their emitters, so that these transistors are cut off. If transistors 8 and 9 were likewise cut off (for example by choosing a sufficiently high voltage for E), the emitters of transistors 8 and 9 would in practice assume the voltage $i/r_3$ and $i/r_4$ respectively. By choosing E of a value such that $v>E>i/r_3$ and $v>E>i/r_4$ where $$v \gg v_1$$
$$v \gg v_2$$

then, in the absence of current through the transistors 8 and 9, the voltage prevailing between emitter and base would make the said transistors conducting. This causes a flow of current through the transistors 8 and 9, but this current also decreases the voltage between emitter and base because of the reduced current through $r_3$ and $r_4$. The transistor thus adjusts itself to a current which is a function of E and $i/r_3$ and $i/r_4$. By suitable proportioning, it may be ensured that the current traversing each of the transistors 8 and 9 is about $\frac{1}{2}i$ if $x=y=1$. Consequently, for $x=y=1$, output terminal 5 delivers no current, but output terminal 6 delivers current. The circuit arrangement thus actually operates as a binary half-adder. The resistors $r_3$ and $r_4$ are preferably given higher values than $r_1$ and $r_2$ in order to minimize the current through the resistors $r_3$ and $r_4$, which is to be regarded as a loss. Serviceable circuit elements are:

$r_1=r_2=120$ ohms, $r_3=r_4=220$ ohms.
Transistors: OC44 or OC170, $i=10$ milliamps, E is about 1 volt.

It is possible for a full adder to be built up in the manner shown in FIG. 1 of two half-adders of the type shown in FIG. 2, but such a full adder would have the following drawbacks:

(1) When the full adder must pass a carry (cases $x_i=1$, $y_i=0$, $c_{i-1,i}=1$, or $x_i=0$, $y_i=1$, $c_{i-1,i}=1$, or $x_i=y_i=c_{i-1,i}=1$), this carry must pass through a resistor ($r_1$) and a transistor (8), in the half adder II which involves a certain delay.

(2) The half-adder will only operate correctly if the transistors are not bottomed. This means that if the outputs of one half-adder are connected to the inputs of another, the potential of terminal 7 in the latter must be some 3 volts more negative than terminal 7 of the former. In certain cases the carry current passes through half-adder I and into the half-adder I in the subsequent full adder stage. This means that the potential of terminal 7 would have to be about 3 volts greater in each successive stage of the adder.

Figure 3:
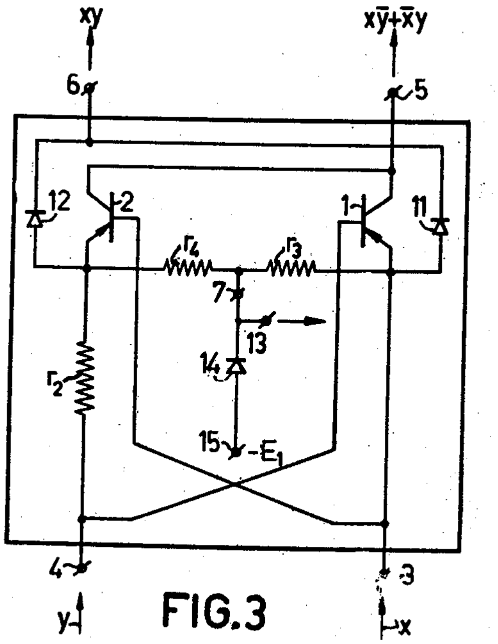
FIG. 3 shows a second example of a half-adder according to the invention.

These two disadvantages may be avoided by providing the half adder II with the circuit shown in FIG. 3. This circuit differs from that of FIG. 2 in that resistor $r_1$ has been eliminated, that the transistors 8 and 9 are replaced by diodes 11 and 12 and that the additional terminal 7 is connected through a clamping diode 14 to a terminal 15 of a voltage source of voltage $-E$, and also connected to a terminal 13 which is a current source value $i_1$. The diode 14 limits, the negative voltage $E_1$ of terminal 7 and the current which passes out of the circuit via said terminal limited to $i_1$. The speed of operation may be increased a little further by using an inductance 16 in series with a diode 17 (see FIG. 4). Usable circuit elements are:

$r_1=0$ ohm, $r_2=120$ ohms, $r_3=470$ ohms, $r_4=330$ ohms, $E_1=6$ volts.
Transistor: OC170, $i=10$ milliamps.
Diodes: Silicon diodes having a forward voltage of 0.5 volt at 5 milliamps and a maximum backward voltage of 6 volts.

Figure 4:
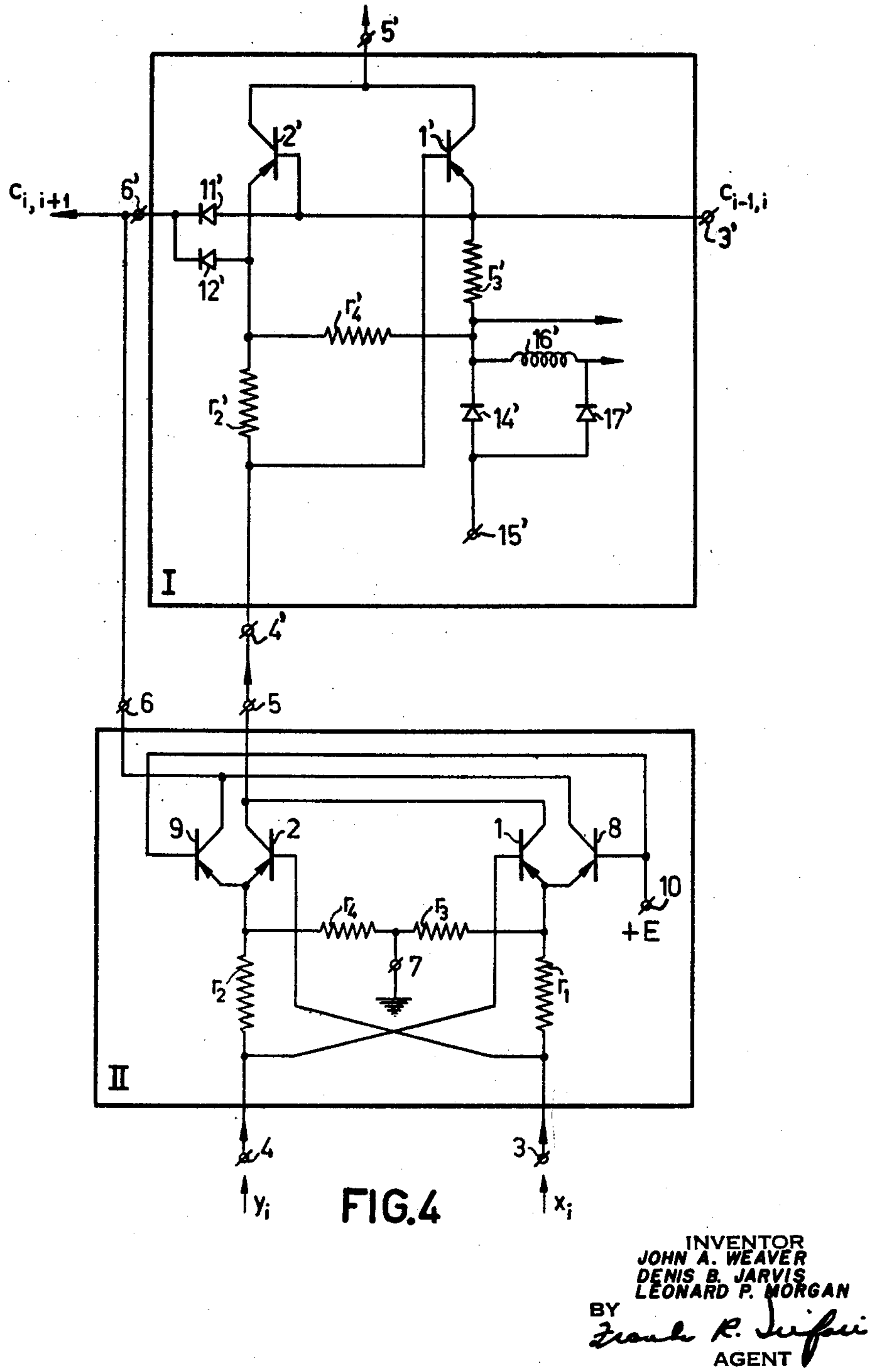
FIG. 4 shows a full adder built up of a half-adder of FIG. 2 and a modified version of the half-adder of FIG. 3.

FIG. 4 shows the circuit arrangement of such a full adder. The operation of the circuit of FIGURE 3 may now be explained in greater detail by reference to FIGURE 4. The parallel adder consists of several stages identical to the one shown. Terminal 6 in each stage is connected to the subsequent stage and terminal 3 in each stage is connected to the previous stage. Consider the operation of half-adder I in one particular stage $i$. If $S_i=1$ and $C_{i-1}$, $i=0$ current flows through transistor 2. Transistor 1 is cut off by the voltage across $r_2$ and the diodes 11 and 12 are not sufficiently forward biassed to conduct. If $S_{i'}=0$ and $C_{i-1,i}=1$ transistor 1 conducts and 2 is cut off. When both $S_i'=0$ and $C_{i-1,i}=1$ both 1 and 2 are cut off and current flows through 11 and 12. In order that the diodes conduct, their anodes must become more positive in potential. Therefore current flows through $r_3$ and $r_4$. But the total current which can flow through them is limited to $i_2+i_3$ which is made equal to $i$. There are two units of current input to half-adder I and so, if only one unit flows to terminal 15, one unit of current must flow as the carry current to the next stage through terminal 6.

The speed of operation of the arithmetic unit may be increased still further by making use of the carry skip principle.

With this technique, the arithmetic unit is sub-divided into sections each having $m$ digit positions. Each section is provided with means for testing the input information so as to detect the condition in which a carry current signal must be propagated through the whole section and onwards to the next section. (It can readily be shown that this condition arises whenever there is at least one digit input "1" to each stage.) The occurrence of this condition causes direct application of a carry signal to the next section.

This mode of operation will now be described more fully with reference to FIGS. 5 to 8.

Figure 5:
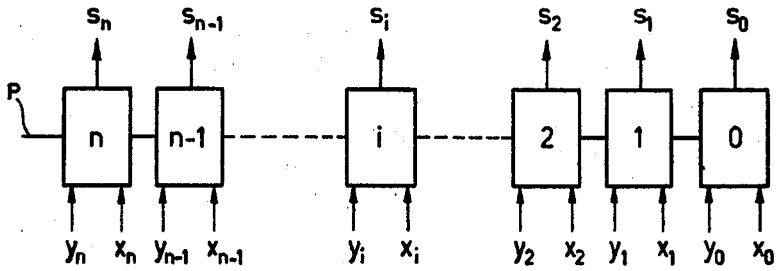
FIGS. 5 and 6 show the carry skip principle.

A binary parallel adder having $n$ digit positions is shown in FIG. 5. From circuits external to the adder there are two inputs, representing corresponding digits of the two binary numbers to be added, and an output from each stage representing the digits of their sum. There is also a carry input to each stage from the preceding stage and a carry output to the next.

If the carry from stage $(m-1)$ is "1" and one of the input digits to stage $m$ is "1," the carry output from stage $m$ will be "1." If the carry input is "1" and both digit inputs are "1," there will again be a carry output of "1." Therefore, if the carry input to stage $m$ is "1" and at least one of the digit inputs is "1," the carry output from stage $m$ will be "1."

It follows that, if there is a carry input of "1" to stage $m$ and at least one digit input is "1" in all of stages $m, m+1, k+2$, and $m+3$, there will be a carry output of "1" from stage $m+3$; thus a carry input could be applied directly to stage $m+4$ (in addition to stage $m$) thereby saving an appreciable amount of time.

The $n$ stages will now be grouped into sections and, for simplicity, it will be assumed that each section contains the same number of stages, $m$. A facility can now be added to inspect the digit inputs to each section and determine whether a carry input of "1" to stage 1 would be propagated and appear as an output of 1 from stage $m$ and, if so, and the carry input is "1," to generate directly a carry input to the next section. Thus, if the time for the inspection and generation is less than the time for the carry signal to be propagated over $m$ stages, a saving in time is obtained.

Figure 6:
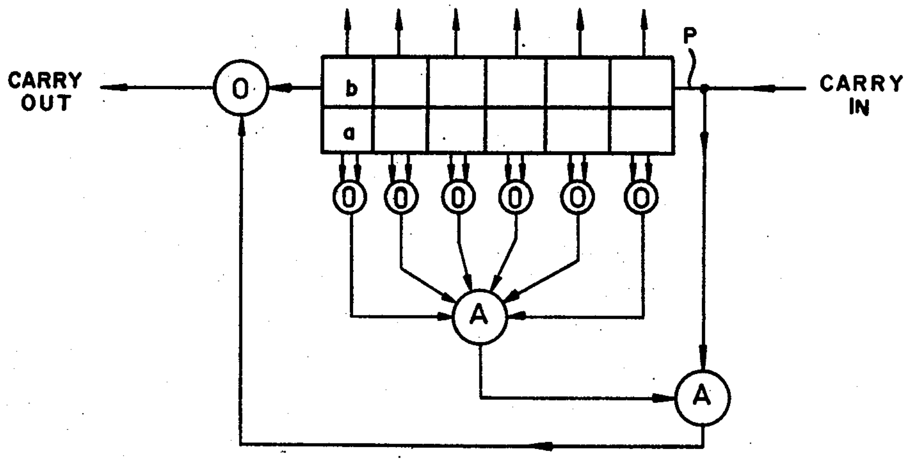
Figure 7:
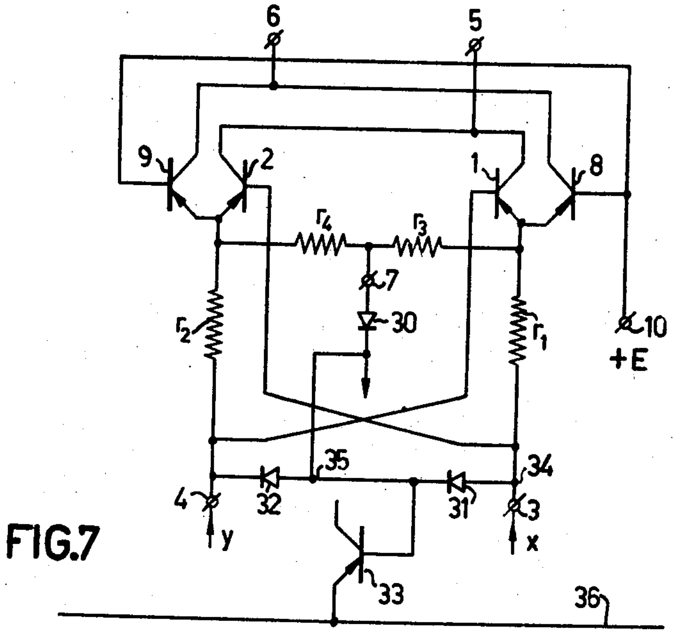
FIG. 7 shows the combination of a half-adder and an "OR"-gate for the use of carry skip.

FIGURE 6 shows the logical elements necessary to produce the carry skip facility. These include an OR circuit for testing the digit inputs of each stage, and an AND circuit for generating a carry signal whenever it receives the maximum number ($m$) of inputs. This carry signal is only passed to the next section when there is also a carry input from the previous section; this is determined by a further AND circuit having two inputs, and it is possible to combine this AND circuit with the $m$-AND circuit into a single AND circuit having ($m+1$) inputs.

The final OR circuit allows a carry signal to be passed to the next section when it originates either in the skip unit or in one of the preceding stages within the section.

The stages are divided schematically into ($a$) and ($b$) half-adders corresponding to those of FIG. 2. Moreover, the fast propagation line of FIG. 5 (employing rectifiers D1) is indicated by the line P.

The "OR"-circuits for testing the input of an individual stage may be constituted by rectifiers (for example point-contact diodes ) 30, 31, 32 and a transistor 33 (FIG. 7) which is added to the adder stage of FIG. 3. The operation of the circuit is as follows. Whenever there is a digit input current, $x$ the potential at point 34 increases, 31 conducts and passes a current $I_3$ (where $I_3$ is very much less than $x$). Then the potential at 35 follows that at 34 and 33 is cut off. Similarly, 33 is cut off when both digit inputs $x$ and $y$ are present. A line 36 connects the emitters of all transistors 33 of the section. Diode 30 prevents the potential of 35 becoming more negative than the potential of 7. A current greater than $I_3$ cannot flow into 35, however, as the diode then becomes reverse biassed. This arrangement limits the current which is taken from the input signal. The collector of transistor 33 is shown unconnected in FIG. 7; this collector may be connected to a voltage source somewhat negative with respect to terminal 7. In particular, the collector voltage should be sufficiently negative to prevent bottoming but not so negative as to cause excessive power dissipation.

Figure 8:
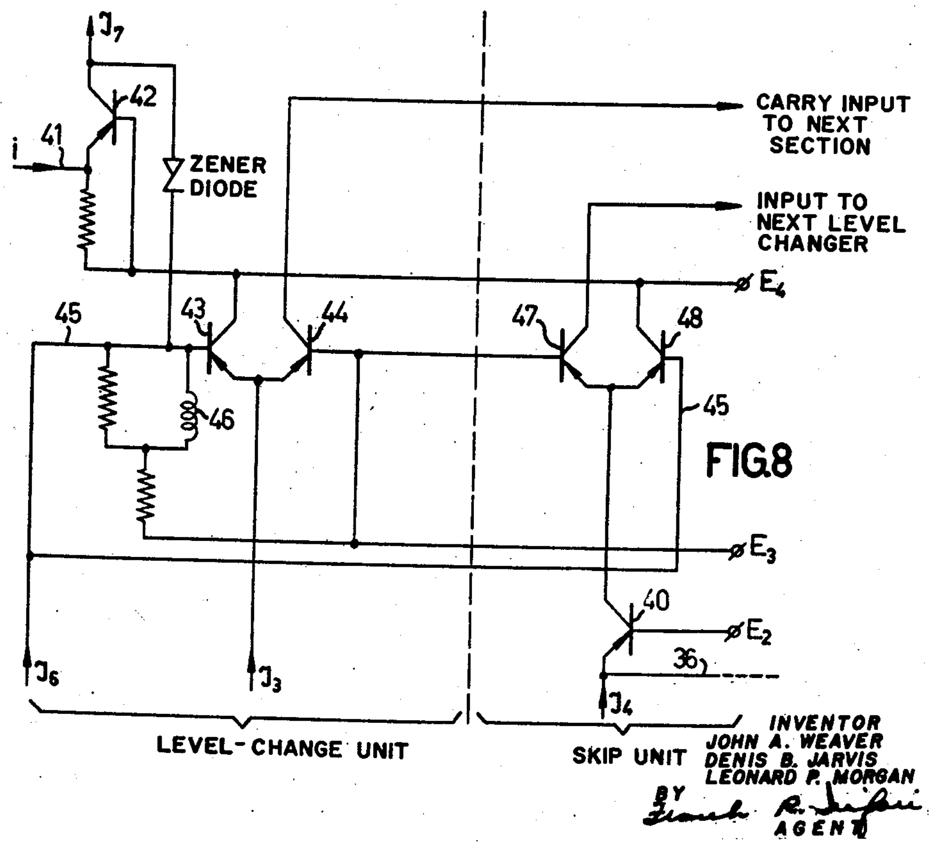
FIG. 8 shows a further detail of the circuit arrangement for the use of carry skip.

FIG. 8 shows an example of the "AND-circuits and final "OR"-circuit of the carry skip unit which follows each section of $m$ stages. Line 36 is the continuation of the line 36 of FIG. 7 and currents $I_4$, $I_3$, $I_6$ are derived from direct current sources. When none of the digit inputs to a section are "1," the current $I_4$ is shared by the several transistors 33, but when at least one input to each of the $m$ stages is "1," all the points 35 are more positive than the potential $E_2$ and transistor 40 passes a current $I_4$.

The level-changing part of the circuit is shown at the left-hand side of the vertical dotted line.

As regards this part, the direct carry signal from the previous section enters the carry skip unit via line 41. The transistors 42, 43, 44 acting in combination with the Zener diode regenerate this signal and restore the voltage level of the carry-current source transistor 44. With no current flowing into line 41, the potential at 45 is arranged to be negative with respect to the potential $E_3$ (by making $I_7>I_6$) and current $I_5$ flows through transistor 43. If a carry current $i_c$ flows in on line 41 and $1_c$ is such that $I_6+i_c>I_7$ the potential at 45 will be positive with respect to $E_2$ and the current $I_5$ will flow through 44 and become the carry input current for the next section. The inductance 46 speeds up the switching of current from 43 to 44. The use of a transistor 43 has the advantage that the stability of the voltage rails is not as critical as in known potential divider arrangements. Furthermore, very little voltage change at line 41 is necessary.

The skip facility is provided by transistors 47, 48, 40. If a carry is to skip the following section of stages, then all the transistors connected to the line 36 of the following section (except 40) will be cut off and therefore the constant current $I_4$ will pass through 40. If there is a carry from the preceding section of stages, then this current $I_4$ will be routed through 47 and thence to the point 41 of the next level-change unit. Otherwise, any current flowing through 40 passes through 48. The potential at 45 is caused to be positive with respect to $E_2$ when there is a carry output from the preceding section. This will cause the current from transistor 40 to be routed through transistor 47 (and along line 41) to the next level-change unit, thereby skipping the following section of stages.

The last "OR"-gate of FIG. 6 is provided by combining the inputs of the "carry" and lines 41 at the emitter of transistor 42. The currents $I_6$ and $I_5$ are chosen so that up to two units of current can be fed into transistor 42; the only effect is that the base of 43 is taken more positive.

The level-change unit introduces a delay of about 50 m$\mu$/secs., so that with 6-stage sections it is possible to propagate the carry in less than 1 $\mu$/sec. through 52 stages. However, this is only the propagation time for a "one;" the time taken to propagate a "zero" after a "one" has been propagated is still 2 $\mu$/secs. Several ways of overcoming this are possible, one of which is to turn off the current $I_5$ whenever the input registers are changed.

What is claimed is:

1. A binary half-adder comprising two input terminals and two transistors each having a collector, an emitter and a base, means for applying input signals in the form of current or no current to the input terminals, two output terminals which deliver the partial sum and the partial carry respectively, likewise in the form of current or no current, characterized in that the first input terminal is connected via a first resistor, which may have the resistance 0, to the emitter of the first transistor and is also connected, through a substantially impedanceless connection, to the base of the second transistor; that the second input terminal is connected via a second resistor to the emitter of the second transistor and is also connected, through a substantially impedanceless connection, to the base of the first transistor; that the emitter of the first transistor is connected via a third resistor to an additional terminal and the emitter of the second transistor is connected via a fourth resistor to an additional terminal, the third and fourth resistors being larger than the first and second resistors; that the collector of each of the transistors is connected to the first output terminal and that the emitters of the transistors are also connected, through semi-conductive circuit elements to the second output terminal.

2. A binary half-adder as claimed in claim 1, characterized in that the semi-conductive circuit elements are additional transistors each having a collector, an emitter and a base, the emitters of which are connected to the emitters of the first-mentioned transistors, the collectors of which are connected to the second output terminal and the bases of which are connected to a second additional terminal.

3. A binary half-adder as claimed in claim 1, characterized in that the semi-conductive circuit elements are diodes.

4. A binary half-adder as claimed in claim 3, characterized in that one of the input terminals is connected, through a substantially impedanceless connection, to the emitter of the associated transistor and diode.

5. A binary full adder composed of two half-adders, the first of which is the half-adder of claim 1 wherein the semi-conductive circuit elements are additional transistors each having a collector, an emitter and a base, the emitters of the additional transistors being connected to the emitters of the transistors of claim 1, the collectors of the additional transistors being connected to the second output terminal and the bases of the additional transistors being connected to a second additional terminal, and the second of which is the half-adder of claim 1 wherein the semi-conductive circuit elements are diodes and one of the input terminals is connected, through a substantially impedanceless connection, to the emitter of the associated transistor and diode, the input terminal of the second half-adder being the output terminal of the first half-adder.

6. A binary parallel full adder which is built up of adders claimed in claim 5, characterized in that the adder is subdivided into sections each comprising a number of full adders, each full adder comprising an "OR"-gate which indicates whether there is at least a digit "1" among the digits to be added, and an "AND"-gate which indicates that all the "OR"-gates have at least detected a "1" and that the carry led to the input of the section is also a "1."

7. An adder as claimed in claim 5, characterized in that the "AND"-gate comprises a first "AND"-gate having led to it the information delivered by the "OR"-gates of the full adders of the section, and a second "AND"-gate having led to it the carry propagated to the input of the section and the information produced by the first "AND"-gate.

8. An adder as claimed in claim 7, characterized in that between each two sections there is provided a circuit for bringing the current corresponding to the carry at the correct voltage level.

References Cited in the file of this patent

UNITED STATES PATENTS 2,995,666 Wood ---------------- Aug. 8, 1961

OTHER REFERENCES

Hunter: Handbook of Semiconductor Electronics, McGraw-Hill Book Co., Oct. 15, 1956 (pp. 15–46 to 15–47 relied on).